US008570983B2

(12) United States Patent
Mohebbi

(10) Patent No.: US 8,570,983 B2
(45) Date of Patent: Oct. 29, 2013

(54) FDD/TDD WIRELESS LINK FOR UNII BAND

(75) Inventor: Behzad Mohebbi, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 711 days.

(21) Appl. No.: 11/799,838

(22) Filed: May 2, 2007

(65) Prior Publication Data

US 2007/0264935 A1    Nov. 15, 2007

Related U.S. Application Data

(60) Provisional application No. 60/796,731, filed on May 2, 2006.

(51) Int. Cl.
*H04B 7/216* (2006.01)
*H04B 7/00* (2006.01)
*H04J 7/00* (2006.01)
*H04W 72/00* (2009.01)

(52) U.S. Cl.
USPC ........... 370/335; 370/203; 370/205; 370/310; 709/220; 455/450

(58) Field of Classification Search
None
See application file for complete search history.

(56) References Cited

U.S. PATENT DOCUMENTS

| 4,510,595 | A | 4/1985 | Glance et al. | |
|---|---|---|---|---|
| 6,611,231 | B2 * | 8/2003 | Crilly et al. | 342/378 |
| 2003/0017830 | A1 * | 1/2003 | Kayama et al. | 455/450 |
| 2005/0030885 | A1 * | 2/2005 | Langley et al. | 370/205 |
| 2005/0162304 | A1 | 7/2005 | Mitsugi | |
| 2005/0243748 | A1 * | 11/2005 | Bosch et al. | 370/310 |
| 2006/0028376 | A1 | 2/2006 | Theobold et al. | |
| 2006/0159003 | A1 * | 7/2006 | Nanda et al. | 370/203 |

FOREIGN PATENT DOCUMENTS

| JP | 06-104865 A | 4/1994 |
|---|---|---|
| JP | 2005-210616 A | 8/2005 |
| JP | 2005318627 A | 11/2005 |
| WO | 2006/045097 | 4/2006 |

OTHER PUBLICATIONS

Examiner's Report dated Feb. 22, 2010, issued by the Australian Patent Office, in connection with corresponding Australian patent application No. 2007248623.

* cited by examiner

*Primary Examiner* — Jinsong Hu
*Assistant Examiner* — William Nealon
(74) *Attorney, Agent, or Firm* — Mintz Levin Cohn Ferris Glovsky and Popeo, P.C.

(57) ABSTRACT

Systems and methods for full duplex communications on a wireless link between two transceiver devices are disclosed. A first portion of outbound data is transmitted from one transceiver device to the other transceiver device on a first channel, while a first portion of inbound data from the other transceiver device is received on a second channel and the presence of a radiating source other than the inbound data is detected. A second portion of the outbound data is transmitted from the transceiver device to the other transceiver device on the second channel, while a second portion of the inbound data is received from the other of the two transceiver devices on the first channel and the presence of a radiating source other than the inbound data is detected.

18 Claims, 7 Drawing Sheets

FDD/TDD WIRELESS LINK FOR UNII BAND

CROSS REFERENCE TO RELATED APPLICATION

The present patent application claims priority under 35 U.S.C. §119 to U.S. Provisional Patent Application Ser. No. 60/796,731, filed on May 2, 2006, and entitled, "FDD/TDD WIRELESS LINK FOR UNII BAND", the entire disclosure of which is incorporated by reference herein.

BACKGROUND

The new channels in the Unlicensed National Information Infrastructure (UNII) band (5 GHz), shown in FIG. 1, require the support of new regulatory requirements such as dynamic frequency selection (DFS), transmit power control (TPC) and uniform spreading (US, or equal loading). While the original 802.11a and the subsequent 802.11n standards, developed for radio local area network (LAN) applications for packet-switched transmissions based on a time division duplex (TDD) operation with low channel occupancy, easily support these new regulatory requirements, such support is more difficult and challenging with simultaneously bi-directional (full duplex) circuit-switched wireless link applications with very low latency limits (i.e. <20 µsec).

One such wireless link over the UNII band is described in patent applications by Mohebbi, WO2005025078, filed Sep. 3, 2003 and WO2005069249, filed Jan. 12, 2004, both entitled "Short-Range Booster" and the contents of which are incorporated by reference herein for all purposes. These applications describe a booster system for frequency division duplex (FDD) cellular systems, as shown in FIG. 2, supporting FDD-type cellular systems according to a number of standards such as wideband code division multiple access (WCDMA), cdma2000 and global system for mobile (GSM), general packet radio system (GPRS) and the enhanced data GSM environment (EDGE).

In the short range booster system 200 shown in FIG. 2, Hop1 and Hop3 are substantially operating at the same frequency in the cellular band, while Hop2 is tuned to operate at the UNII band or the industrial, scientific and medical (ISM) band. Hop1 is the communication link to the base transceiver system (BTS), while Hop3 is the communications link to the mobile subscriber (MS) unit in FDD mode. Hop2 is the communications link between a network unit 202 and a user unit 204 of the short range booster system 200, which includes two-way traffic and control channels, required to meet the latency (delay) requirements of the target cellular system (e.g. WCDMA requires a latency of no more than 20 µsec for the total booster operation, so that a RAKE receiver, in the handset or BTS, can combine direct and boosted signal energies).

There are in total nearly twenty-three non-overlapping 20 MHz channels defined in the United States for the UNII spectrum shown in FIG. 1. Current WiFi systems such as 802.11 "a" or "n", use one or two channels in this spectrum, operating in TDD mode for Radio LAN applications. These systems cannot meet the FDD requirements of cellular systems, with its required latency, while meeting the regulatory requirements for DFS, radar detection, and uniform spreading. For example, just the preamble and the "signal field" symbol of the 802.11a (or n) systems, which are required for the physical layer operation, can be 20 µsec. This alone consumes the allowed latency budget, leaving no margin for the other processing delays for the transceiver. Further, the 802.11 media access control (MAC) layer introduces non-deterministic latency, as the MAC operation is based on CSMA/CA.

The UNII band is divided into two distinct separate blocks with contiguous channels in each block, for FDD operation (an example is shown in FIG. 3). In such FDD partitioning, for example, the "Duplex I" block can have 7 channels, while "Duplex II" block can include 8 channels. Therefore, in the given example, a channel (or a number of channels) in the "Duplex I" band can be assigned for a given direction between the network unit and user units shown in FIG. 2, while transmissions in the other direction can be supported by a channel (or number of channels) in the "Duplex II" block. Although this arrangement will meet the FDD requirement of the cellular systems, it will not meet the DFS and Uniform Spreading requirements of UNII band, nor will it meet the short latency requirement of cellular systems.

SUMMARY

Disclosed is a method and apparatus to enable operation of a wireless link operating in the UNII band channels, supporting the full duplex, bidirectional FDD cellular transmissions with the specified latency of the target cellular system, while meeting the regulatory requirements such as the DFS, TPC, radar detection, and uniform spreading.

In one aspect, a method for full duplex communications on a wireless link between two transceiver devices includes transmitting a first portion of outbound data to the other of the two transceiver devices on a first channel, while receiving a first portion of inbound data from the other of the two transceiver devices and detecting for the presence of a radiating source other than the inbound data on a second channel. The method further includes transmitting a second portion of the outbound data to the other of the two transceiver devices on the second channel, while receiving a second portion of the inbound data from the other of the two transceiver devices and detecting for the presence of a radiating source other than the inbound data on the first channel.

In another aspect, a technique for full duplex communications on a wireless link from one transceiver device to another transceiver device, includes transmitting, with a transmitter, a first portion of outbound data to the other of the two transceiver devices on a first channel and receiving, with a receiver, a first portion of inbound data from the other of the two transceiver devices while detecting for the presence of a radiating source other than the inbound data on a second channel. The technique further includes switching the transmitter and receiver to transmit a second portion of the outbound data to the other of the two transceiver devices on the second channel and receive a second portion of the inbound data from the other of the two transceiver devices while detecting for the presence of a radiating source other than the inbound data on the first channel.

In yet another aspect, a communication system includes a first transceiver device configured for full duplex communications on a wireless link with a second transceiver device. Each transceiver device is further configured to transmit a first portion of outbound data to the other of the two transceiver devices on a first channel, while receiving a first portion of inbound data from the other of the two transceiver devices and detecting for the presence of a radiating source other than the inbound data on a second channel. Each transceiver device is further configured to transmit a second portion of the outbound data to the other of the two transceiver devices on the second channel, while receiving a second portion of the inbound data from the other of the two transceiver devices and detecting for the presence of a radiating source other than the inbound data on the first channel.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a method and apparatus to enable operation of a wireless link operating in the UNII band channels, supporting the full duplex, bi-directional FDD cellular transmissions with the specified latency of the target cellular system, while meeting the regulatory requirements such as the DFS, TPC, radar detection and uniform spreading.

Figure 1:
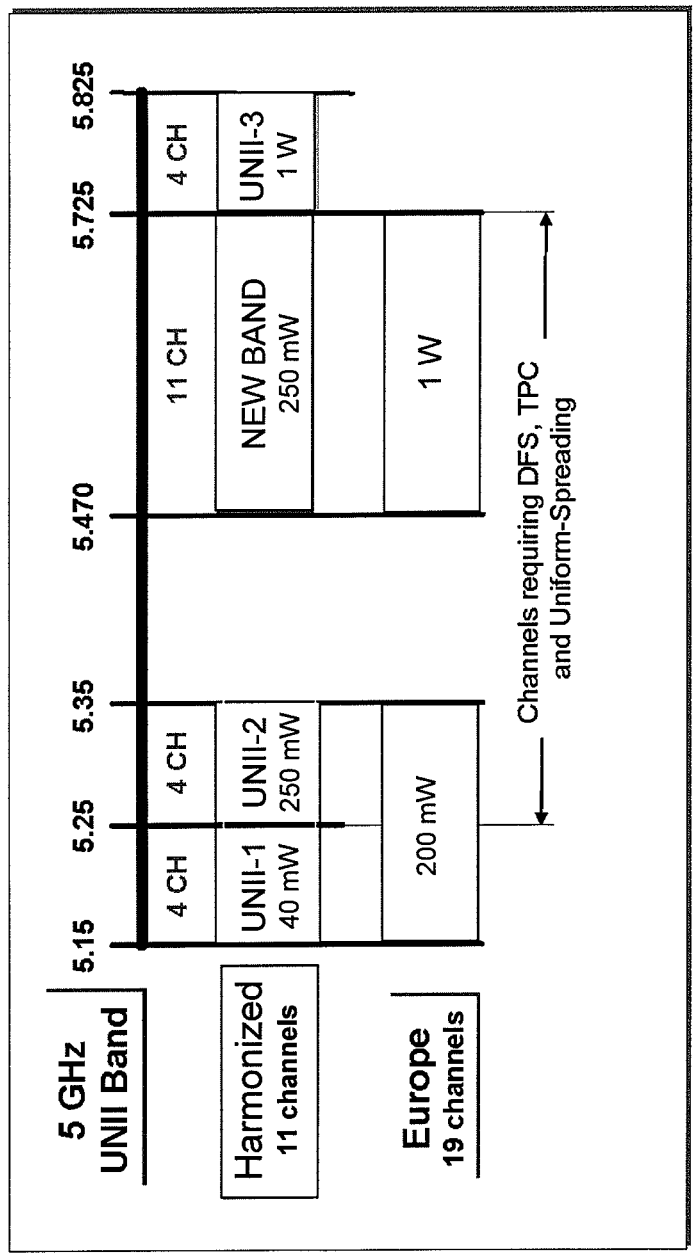
FIG. 1 depicts the channels of the UNII band of communication frequencies.
Figure 2:
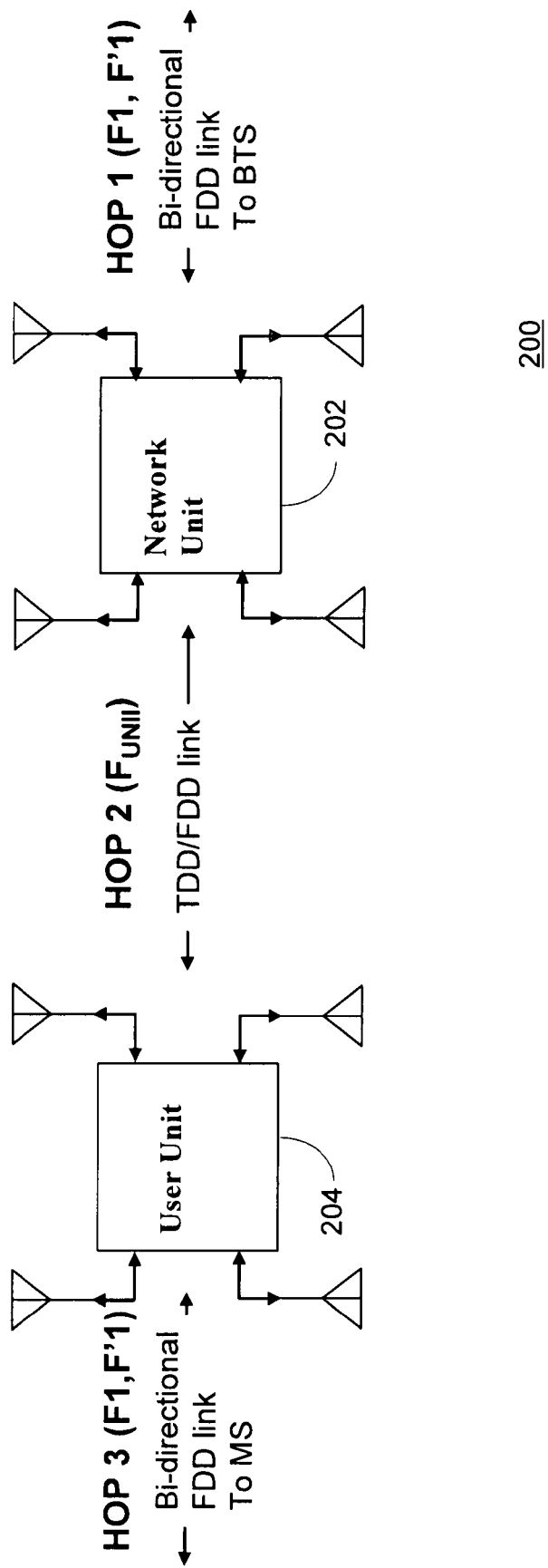
FIG. 2 illustrates a short range booster system having an autonomous middle hop operating in the UNII band.
Figure 4:
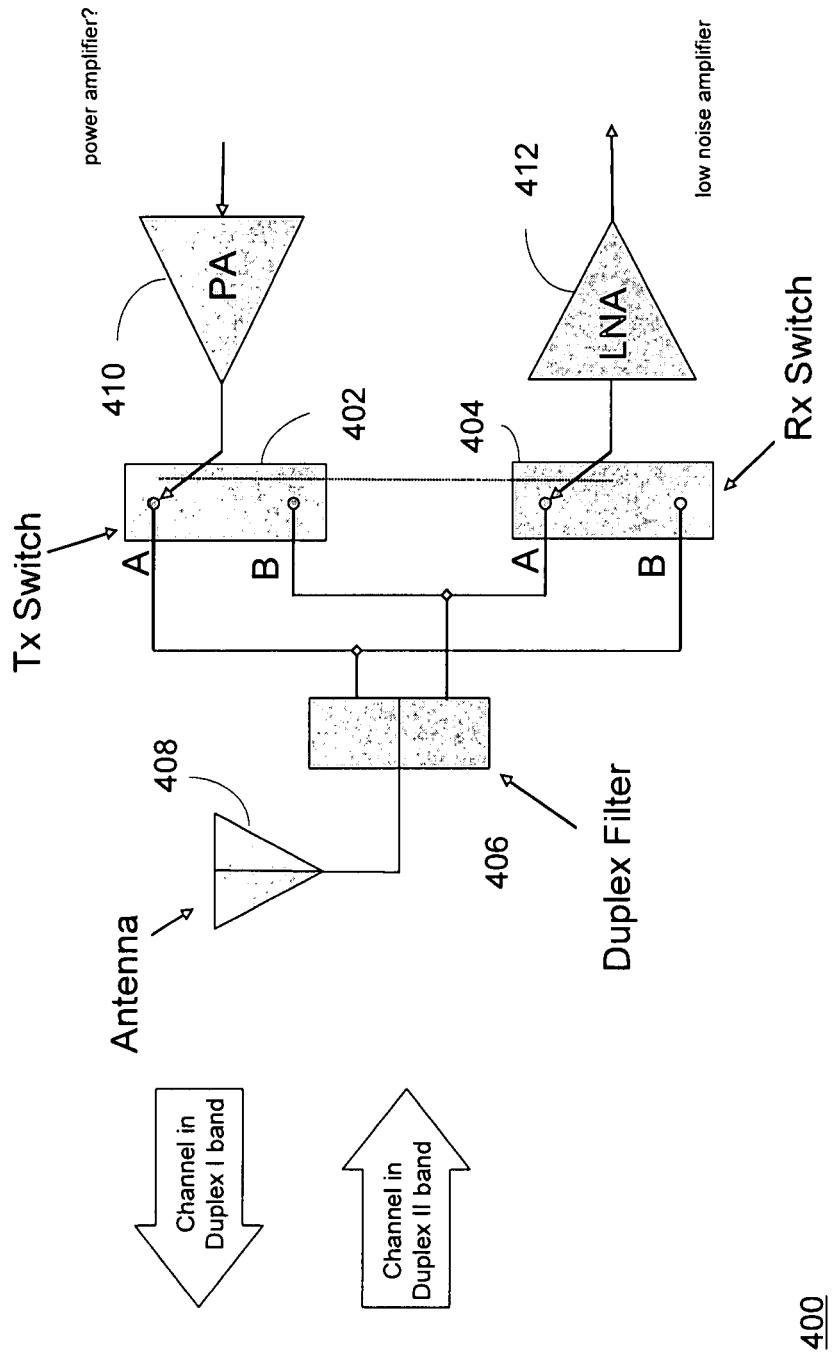
FIG. 4 illustrates a switching system for the autonomous middle hop of the short range booster system.

To meet DFS, radar detection and uniform spreading requirements, one implementation of a switching network 400 is presented as shown in FIG. 4, with reference also to FIG. 2. The switching network 400 includes a transmission (TX) switch 402 and a receiver (RX) switch 404, which are operated synchronously. The TX switch 402 transmits outbound data to a wireless link from power amplifier 410, while the RX switch 404 receives inbound data from the wireless link for a low noise amplifier 412. The switching network 400 can be integrated with the functional components of a transceiver, or may be connected externally to a transceiver.

A switching network 400 is preferably placed before a duplex filter 406 and antenna 408 in both the network unit 202 and user unit 204 shown in FIG. 2, and operated in synchronous opposition (or "complimentary," i.e., while the network unit 202 switches 402 and 404 are in the "A" position, the user unit 204 switches 402 and 404 are in the "B" position). A given unit (say network unit 202), operates such that while the two TX and RX switches 402 and 404 are in position "A," the transmitted signal is in one channel (or channels), i.e. a duplex I band shown in FIG. 3, while the received signal is in another channel (or channels) in the other band, i.e. the duplex II band shown in FIG. 3.

The choice of the channel (or channels) in the two duplex bands is based on the availability of the channels, following a channel availability check (CAC). The switches are maintained in position "A" for a period of time, for example 100 μsec, before they are changed to position "B". Now, the channel (or channels) in duplex I band is used for the receiving signal at this unit (network unit 202 in this example). This together with a "fine" open-loop transmit power control (with step sizes of say 1 dB) from the other unit (the user unit 204 in this example makes measurements while receiving on this channel), will allow for radar pulse detection at the required threshold of −64 dB (or −62 dB, depending on the unit transmit power), which will be at least nearly 6 dB above the received signal power from the other unit. A radar detector that distinguishes between the radar pulses and the received signal envelope variations, e.g. energy detection, is used for this purpose.

By way of example, with the switches in position "B", the network unit 202 transmit signals will now be in a channel (or channels) in duplex II band. Again, once the switches are placed in position "A" (in the next 100 μsec for example), the network unit 202 performs in-service-monitoring of the operating channel (or channels) in the duplex II band for radar pulse detection while in the receiving mode. The same operations are carried out on the user unit 204 side. Therefore both the network unit 202 and user unit 204 require "fine" open-loop transmit power control (i.e. 1 dB step), which is based on measurements made at the receive cycle of a given operating channel(s). Accordingly, the UNII band link now has both FDD and TDD operational mode (i.e. FDD/TDD link). If a radar pulse is detected, either unit can halt transmissions, carry out new CAC on both duplex portions at both ends, and select a channel (or channels) and start an operation similar to a power "ON" or "reset" procedure.

The complimentary switching arrangement will enable both units to meet the Uniform Spreading requirement. For example, upon power "ON" or "reset," only the network unit 202 will transmit on a channel, selected randomly from the duplex I and duplex II bands (subject to CAC). The user unit 204, being part of a radio network, on reception of the network unit 202 transmissions in a given band, then follows the switching pattern in an opposite sense of the network unit 202 in transmission and reception in the selected band. As the two units are fully synchronized, they can be controlled to switch to the other Duplex band.

Figure 5:
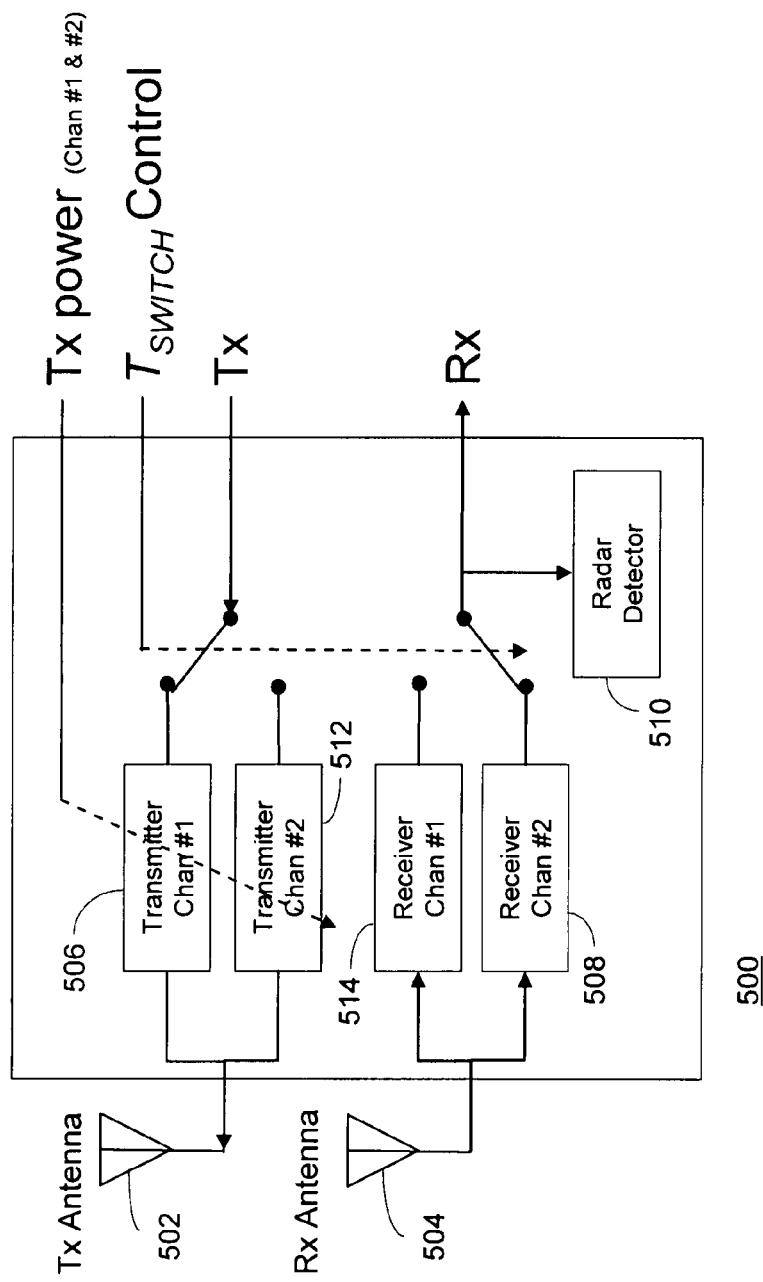
FIG. 5 illustrates a transceiver for full duplex communications over a wireless link to another transceiver.

FIG. 5 illustrates a transceiver 500 having an alternative switching arrangement. The transceiver 500 includes a transmission (TX) antenna 502 and a receiver (RX) antenna 504. It will be apparent to those of skill in the art that the TX antenna 502 and/or RX antenna 504 can be made up of multiple antennas, or may be combined in a single antenna structure. The transceiver 500 can also include various communication components that are not shown in FIG. 5 for sake of simplicity and clarity.

The transceiver 500 transmits a first portion of outbound data to at least one other transceiver on a first channel 506 (a channel in duplex I band), while receiving a first portion of inbound data from the other transceiver and detecting, with a radar detector 510 for the presence of a radiating source other than the inbound data on a second channel 508 (a channel in duplex II band). The transceiver 500 further transmits a second portion of the outbound data to the other transceiver on a second transmitter channel 512, while receiving a second portion of the inbound data from the other transceiver device and detecting, with the radar detector 510, for the presence of a radiating source other than the inbound data, on a first receiver channel 514.

Figure 6:
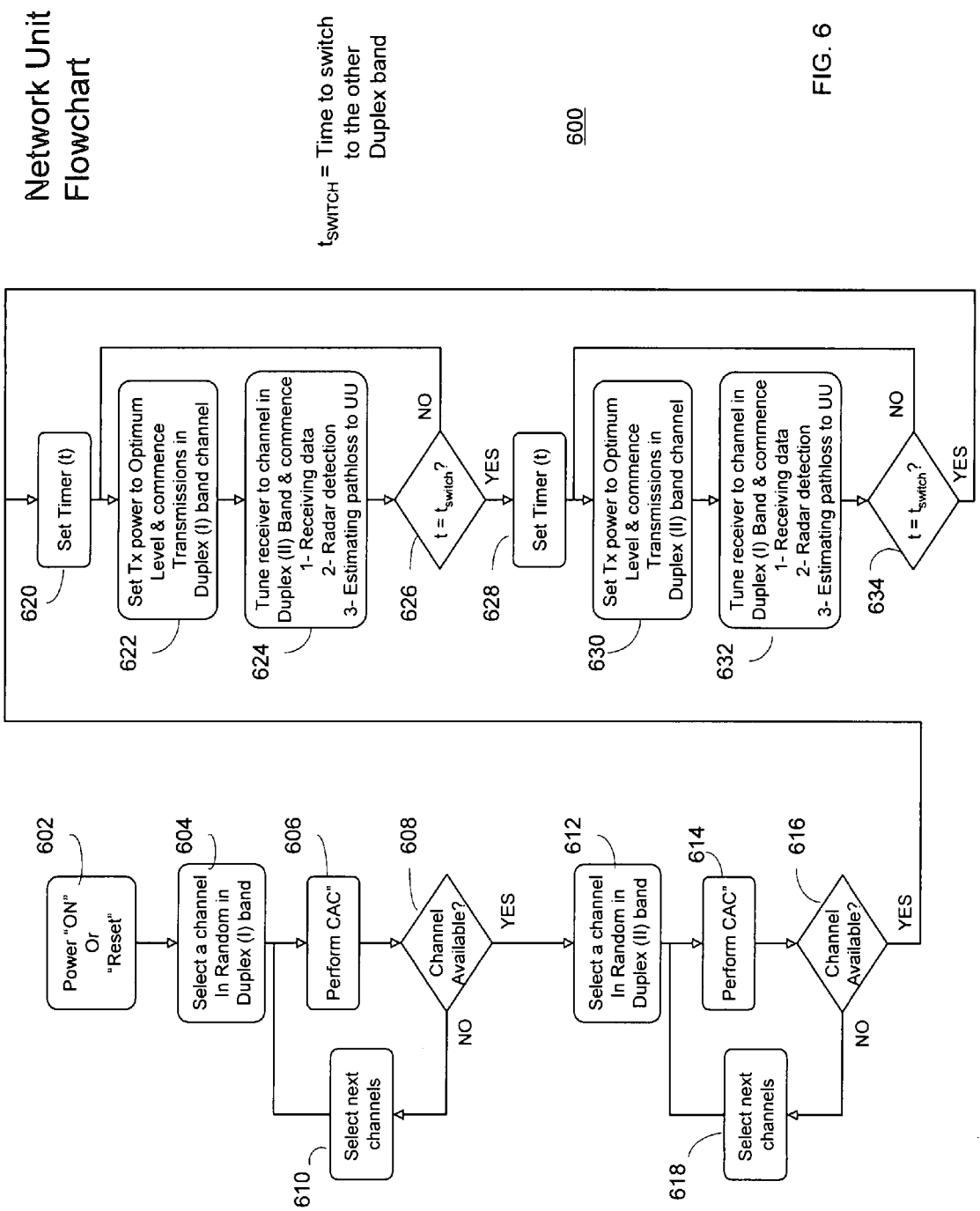
FIG. 6 is a flowchart of a method for full duplex communications by a network unit.

FIG. 6 illustrates a method 600 of a network unit for full duplex communications on a wireless link. At 602, power at a transceiver device, such as a network unit 202 in FIG. 2, is turned "on" or "reset." At 604, a first channel (i.e. within the duplex I band of FIG. 3) is randomly selected. At 606, CAC is performed on the selected channel and at 608 it is determined whether the selected first channel is available. If not, at 610 a next first channel is selected and the method 600 repeats at 606. If the selected channel is available, at 612 a second channel (i.e. within the duplex II band of FIG. 3) is randomly selected. At 614, CAC is performed on the selected channel and at 616 it is determined whether the selected second channel is available. If not, at 618 a next second channel is selected and the method 600 repeats at 614.

At 620, a timer (t) is set, and at 622 transmit power of a transmitter is set to an optimum level to commence transmission in the first channel. Meanwhile, at 624, a receiver is tuned to the selected second channel to commence receiving data, detect for radar signals other than received data, and estimate for pathloss to the user unit. The process continues until, at 626, a switch time is realized, which then provides for the timer to be set again at 628. At 630, transmit power of the transmitter (or a second transmitter) is set to an optimum level to commence transmission in the second channel. Meanwhile, at 632, the receiver (or a second receiver) is tuned to the selected first channel to commence receiving data, detect for radar signals other than received data, and estimate for pathloss to the user unit. When time t=the switch time, the method 600 repeats at 620.

Figure 7:
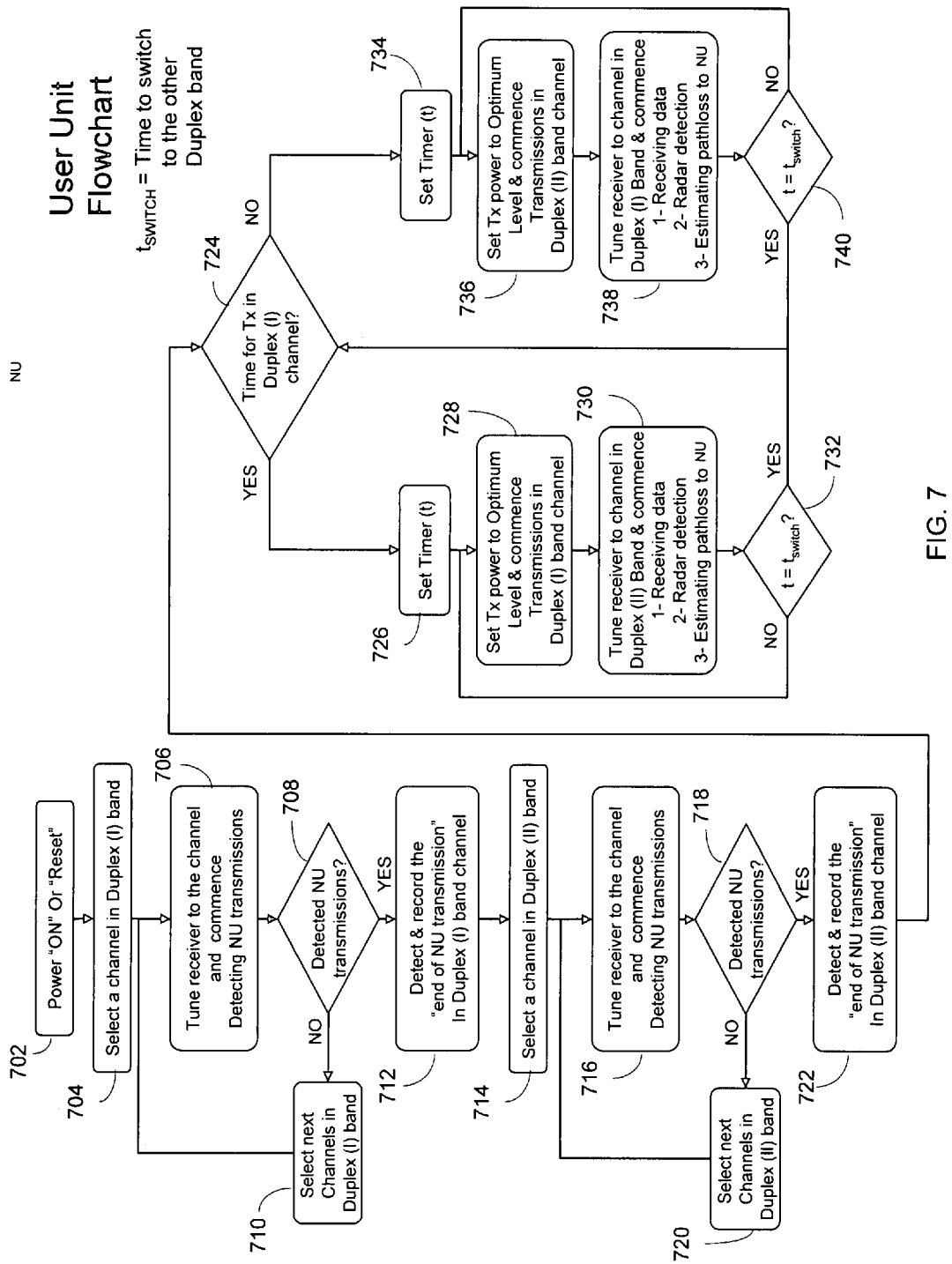
FIG. 7 is a flowchart of a method for full duplex communications by a user unit.

FIG. 7 illustrates a method 700 of a user unit for full duplex communications on a wireless link. At 702, power at a transceiver device, such as a network unit 202 in FIG. 2, is turned "on" or "reset." At 704 a first channel is selected, such as a channel or channels in duplex I band shown in FIG. 3. At 706, the receiver is tuned to the selected channel, and detection of transmission from the network unit is commenced. At 708, it is determined whether any transmissions from the network unit are detected. If not, at 710 a next channel is selected in the band, and the method 700 repeats at 706. If transmissions from the network unit are detected, at 712 the "end of transmission" is detected and recorded.

Figure 3:
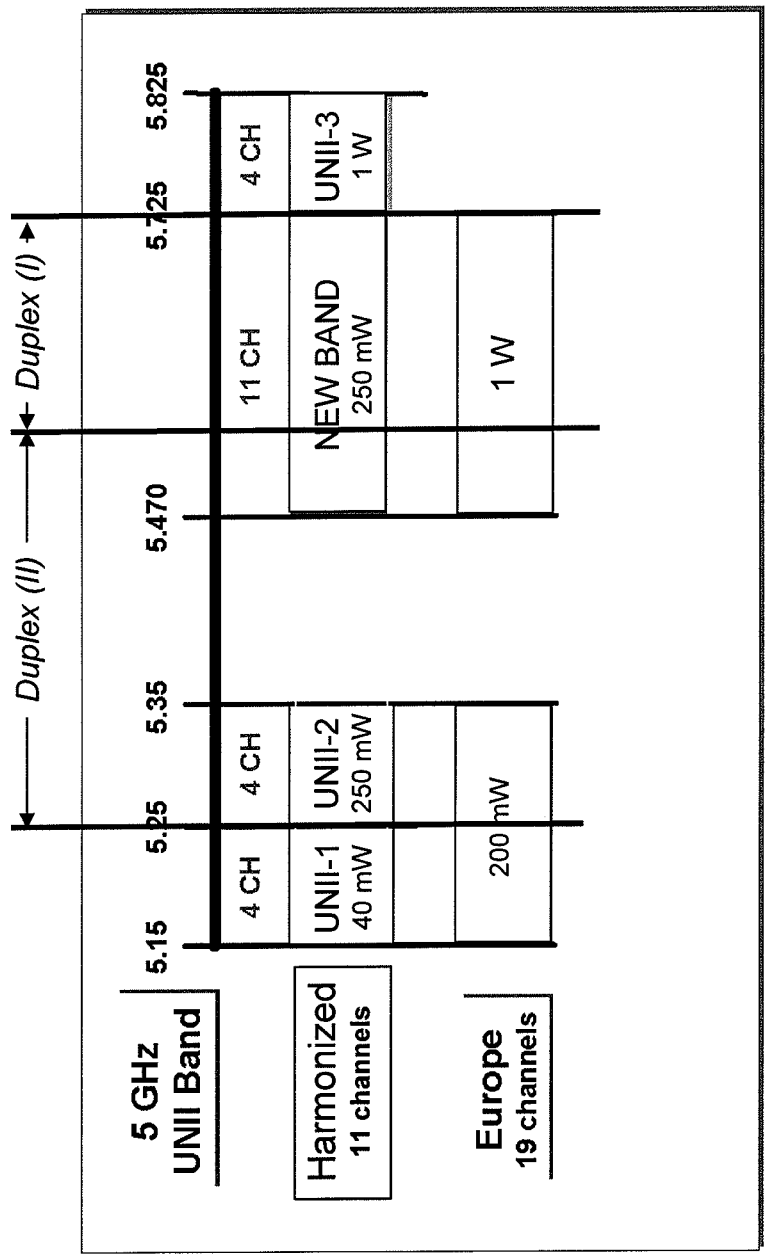
FIG. 3 depicts a first and second duplex band of frequencies within the UNII band.

At 714, a second channel is selected, such as a channel or channels in the duplex II band shown in FIG. 3. At 716, the receiver is tuned to the selected channel, and detection of transmission from the network unit is commenced. At 718, it is determined whether any transmissions from the network unit are detected. If not, at 720 a next channel is selected in the band, and the method 700 repeats at 716. If transmissions from the network unit are detected, at 722 the "end of transmission" is detected and recorded.

At 724, it is determined whether transmissions are to occur in the first channel, i.e. the duplex I band of frequencies. If so, at 726 a timer is set, and at 728 transmit power is set to an optimum level, and transmissions are commenced in the first channel while at 730 the receiver is tuned to the second channel (i.e. duplex II band) to receive data, perform radar detection, and estimate the pathloss to the user network unit. At 732 it is determined whether the timer is set to switch. If not, the method 700 repeats at 726. If so, the timer is reset at 734.

At 724 it is again determined whether transmissions are to occur in the second channel, i.e. the duplex II band of frequencies. If so, at 734 a timer is set, and at 736 transmit power is set to an optimum level, and transmissions are commenced in the second channel while at 738 the receiver is tuned to the first channel (i.e. duplex I band) to receive data, perform radar detection, and estimate the pathloss to the user network unit. At 740 it is determined whether the time is again set to switch. If so, the method 700 repeats at 724, and if not, the method 700 repeats at 736.

The above disclosed arrangement and technique will meet the FDD requirements of the cellular system link, while meeting the regulatory DFS, radar detection, and uniform spreading requirements. But it will still not necessarily meet the latency requirement (e.g. 20 μsec for WCDMA). To meet the example 20 μsec latency requirement, a new Media Access Control (MAC) and physical layer design is required.

The physical layer modulation can be kept substantially similar to 802.11 "a" or "n", with a BPSK, QPSK, 16 and 64 QAM, 64-sub carrier OFDM modulation, operating over a 20 or 40 MHz channel. However, as the link operation is now regular and continuous as almost a circuit-switched operation, a much shorter preamble (for example, 4 μsec), can be used for the required physical estimations such as frequency offset, automatic gain control (AGC) and channel estimation.

While clock timing is not required for such short packets (<100 sec) used in such a system, other estimations can be aided by previous received packets, as the packets are now arriving on regular interval (every other 100 μsec in this example). The much shorter preamble reduces the latency, and when receive processing latency (for example, 8 μsec) is added to the transmission latency, a 8 μsec budget is provided for other processing latencies in the link chain, according to the 20 μsec latency requirements at the physical layer. There is no need for the signal field, as the bit rate and the packet size are both fixed with this arrangement.

Thus, the MAC is no longer based on carrier sense multiple access with collision avoidance (CSMA/CA), a class of standard collision avoidance protocols for communication channels. Rather, the MAC can assume the channel is always available, unless otherwise informed by the radar detection algorithm unit. The now much shorter preamble can also be used to assess signal-to-noise ratio (SNR), or channel impulse response (CIR), to detect any interference from other devices, without the need for a cyclic redundancy check (CRC). There is also no need for retransmissions, as the cellular links are designed to operate with a given bit error rate (BER) (e.g. 0.01 for voice).

Although a few embodiments have been described in detail above, other modifications are possible. The logic flows depicted in FIGS. 6 and 7 do not require the particular order shown, or sequential order, to achieve desirable results. Other embodiments may be within the scope of the following claims.

What is claimed:

1. A method for full duplex communications on a wireless link between two transceiver devices, the method comprising:
    transmitting a first portion of outbound data to the other of the two transceiver devices on a first channel, while receiving a first portion of inbound data from the other of the two transceiver devices on a second channel, wherein the first and second channels are within the UNII band of frequencies, and detecting for the presence of a radiating source other than the inbound data on the second channel; and
    transmitting a second portion of the outbound data to the other of the two transceiver devices on the second channel, while receiving a second portion of the inbound data from the other of the two transceiver devices on the first channel and detecting for the presence of a radiating source other than the inbound data on the first channel.

2. A method in accordance with claim 1, further comprising estimating pathloss while receiving the first portion of inbound data and while receiving the second portion of inbound data.

3. A method in accordance with claim 1, wherein the first channel corresponds to a first set of frequencies in the UNII band of frequencies, and the second channel corresponds to a second set of frequencies in the UNII band of frequencies.

4. A method in accordance with claim 1, further comprising: selecting the first channel; and performing a channel availability check on the selected first channel until an available first channel is determined.

5. A method in accordance with claim 4, further comprising: selecting the second channel; and performing a channel availability check on the selected second channel until an available second channel is determined.

6. A method in accordance with claim 1, further comprising switching from transmitting the first portion of outbound data to the other of the two transceiver devices on the first channel to transmitting the second portion of the outbound data to the other of the two transceiver devices on the second channel.

7. A method in accordance with 1, wherein the switching occurs at a predetermined time.

8. A method in accordance with claim 6, further comprising switching from receiving the first portion of inbound data from the other of the two transceiver devices on the second channel to receiving the second portion of the inbound data from the other of the two transceiver devices on the first channel.

9. A method in accordance with claim 8, wherein the switching occurs at the predetermined time.

10. In a transceiver device, a method for full duplex communications on a wireless link to another transceiver device, the method comprising:
transmitting, with a transmitter, a first portion of outbound data to the other of the two transceiver devices on a first channel and receiving, with a receiver, a first portion of inbound data from the other of the two transceiver devices on a second channel, wherein the first and second channels are within the UNII band of frequencies, while detecting for the presence of a radiating source other than the inbound data on the second channel;
switching the transmitter and receiver to transmit a second portion of the outbound data to the other of the two transceiver devices on the second channel and receive a second portion of the inbound data from the other of the two transceiver devices on the first channel while detecting for the presence of a radiating source other than the inbound data on the first channel.

11. A method in accordance with claim 10, further comprising estimating pathloss while receiving the first portion of inbound data and while receiving the second portion of inbound data.

12. A method in accordance with claim 10, wherein the first channel corresponds to a first set of frequencies in the UNII band of frequencies, and the second channel corresponds to a second set of frequencies in the UNII band of frequencies.

13. A method in accordance with claim 10, further comprising: selecting the first channel; and performing a channel availability check on the selected first channel until an available first channel is determined.

14. A method in accordance with claim 13, further comprising: selecting the second channel; and performing a channel availability check on the selected second channel until an available second channel is determined.

15. A communication system comprising:
a first transceiver device configured for full duplex communications on a wireless link with a second transceiver device, each transceiver device further configured to:
transmit a first portion of outbound data to the other of the two transceiver devices on a first channel, while receiving a first portion of inbound data from the other of the two transceiver devices on a second channel, wherein the first and second channels are within the UNII band of frequencies, and detecting for the presence of a radiating source other than the inbound data on the second channel; and
transmit a second portion of the outbound data to the other of the two transceiver devices on the second channel, while receiving a second portion of the inbound data from the other of the two transceiver devices on the first channel and detecting for the presence of a radiating source other than the inbound data on the first channel.

16. A communication system in accordance with claim 15, wherein each transceiver further includes a radar detector for detecting for the presence of the radiating source other than the inbound data.

17. A communication system in accordance with claim 15, wherein each transceiver further includes a timer for setting a time to switch between transmitting on the first channel and transmitting on the second channel.

18. A communication system in accordance with claim 15, further comprising a channel selector for selecting the first and second channels.

* * * * *